United States Patent

Richardson

[15] 3,698,059
[45] Oct. 17, 1972

[54] EZE-WIRE AND CABLE PULLER

[72] Inventor: Gayle Darwin Richardson, 505 Dallas Avenue, Artesia, N. Mex. 88210

[22] Filed: July 8, 1971

[21] Appl. No.: 160,838

[52] U.S. Cl. .................. 29/203 H, 29/203 C, 29/241, 254/134.3 FT
[51] Int. Cl. ........................ H01r 43/00, B23p 19/04
[58] Field of Search ..... 29/203 C, 203 R, 241, 203 R, 29/203 H; 254/134.3 R, 134.3 FT

[56] References Cited

UNITED STATES PATENTS

| | | |
|---|---|---|
| 2,591,550 | 4/1952 | Kane .................... 254/134.3 R |
| 3,312,128 | 4/1967 | Wasson ........... 254/134.3 R X |
| 3,460,229 | 8/1929 | Crew et al. ................ 29/203 H |
| 3,549,128 | 12/1970 | Homiak et al. ..... 254/134.3 FT |

*Primary Examiner*—Thomas H. Eager

[57] ABSTRACT

This invention relates to a one-piece wire and cable puller, with no moving parts, which will efficiently and quickly pull wires and cables through apertures in any wall or place where threading or pulling might be difficult.

1 Claim, 3 Drawing Figures

3,698,059
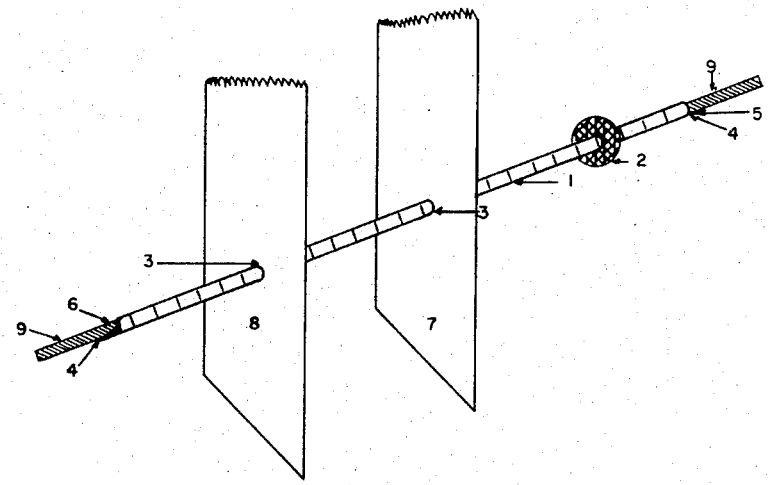
Fig. 1
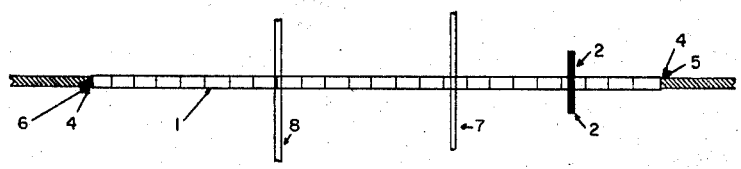
Fig. 2
Fig. 3
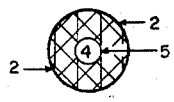
INVENTOR:
Gayle Darwin Richardson

EZE-WIRE AND CABLE PULLER

In installing service wires and cables where apertures must be drilled through an existing wall, it is often difficult to thread the wire or cable through the apertures, due to existing insulation between the inside and outside walls, or because of the thickness of the wall and the flexibility of the wire or cable trying to be pushed through. It has been a common practice to drill the apertures much larger than actually needed so as to more easily thread the wire or cable through; thereby leaving an unsightly blemish on the wall, which also gives easy access to bugs and insects into the home. It is the usual practice to try and sight with the eye and push the wire or cable through the apertures. The first aperture is easy, but being unable to see the second aperture, you must feel for it. Usually you will fail to accomplish your goal, at which time the serviceman or installer will find a stiff wire, or straighten out a coat hanger, push it through both apertures, tie or tape the wire or cable to it, and pull both back through the enlarged holes. Needless to say, this is a time consuming process.

It is with the solution to this problem that this invention deals:

Essentially, the invention is a rigid piece of plastic or metal tubing with inside diameter of sufficient size to allow cable or wire to pass through and wall thickness of the tubing great enough to provide ample rigidity and length to enable the serviceman to push it through the apertures, regardless of wall thickness. This tubing is angle cut on one end to enable easier insertion, and has a washer of sufficient size and diameter permanently affixed to the other end, leaving enough room to grip with one hand on square cut end, so that the tube cannot accidentally be pushed or pulled too far through the wall.

With this wire and cable puller, installing a service wire is a simple procedure. The serviceman must first drill a hole only large enough for the tool to pass through from the inside to outside walls. Push angle cut end of tool through both apertures, from inside - out, until the retaining washer is flush against the inside wall. At this time the service man goes to the outside wall, grips tool with one hand, threads wire or cable through the center of the tool until he is certain he has a sufficient amount through the tool to be able to grip it on the inside. Returning to inside he grips wire and tool at same time, pulls what is required inside, and when this has been accomplished he simply slides the tool off end of cable. Due to the thin walls of the tubing on the tool, it makes a very neat, efficient and time saving installation.

The objects and advantages of the invention will be apparent from the following detailed description taken in conjunction with the accompanying drawings, in which;

FIG. 1 is a perspective view illustrating fragmentarily an inside and an outside wall with cable having been pushed through the tool, the wire and cable puller;

FIG. 2 is an enlarged plan view of the tool shown in FIG. 1;

FIG. 3 is a vertical section view taken on the line 2—2 of FIG. 2.

As shown in the drawing, FIG. 1, the number 7 represents the inside wall and the number 8 represents the outside walls of a building, and referring in particular to FIGS. 1 - 2 and 3, the numeral 1 represents, in general, a one-piece tool embodying the features of the invention, which tool is formed from a rigid plastic or metal tube 4—4 of a suitable length and diameter. The formed tool 1 comprises a main body portion of circular configuration having a diameter suitable for the particular diameter of the cable or wire 9 being handled and the apertures 3—3 into which the tool 1 is to be inserted, with a retaining washer 2 permanently affixed or molded to the body nearest square cut end 5 of tool 1, with opposite end 6 cut on a 45° angle. As cable 9 is pushed into end with angle cut 6 the tool 1 is held with other hand so as not to push tool 1 out of apertures 3—3. When sufficient cable 9 has been pushed through the tool hollow shaft 4—4 to pass through end 5 enough to grip both cable 9 and tool end 5 with same hand, both are pulled inside from apertures 3—3 to the desired length needed. Tool 1 is then slipped from cable 9.

It will also be apparent that more than one cable or wire could be simultaneously threaded and pulled through the apertures provided the tool is suitably dimensioned relative to the diameter of the cables, or wires and the apertures.

What is claimed is;

1. A tool for threading and pulling single or multiple cables or wires through more than one aperture, made of rigid plastic or metal tubing, having one end angle cut for easier threading, and a retaining washer around said tubing for easier use of the tool, said tool enabling the servicing or installing of cables and wires to be done more efficiently, quickly and neatly.

* * * * *